Feb. 18, 1964 M. R. ROBINSON 3,121,295
ROTARY AIR-CIRCULATING MACHINE
Filed Feb. 1, 1962 2 Sheets-Sheet 1
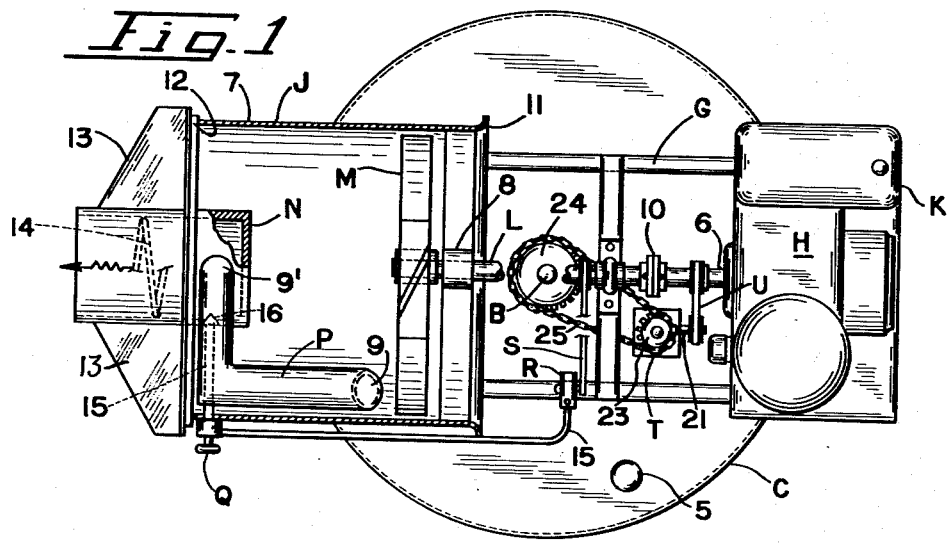
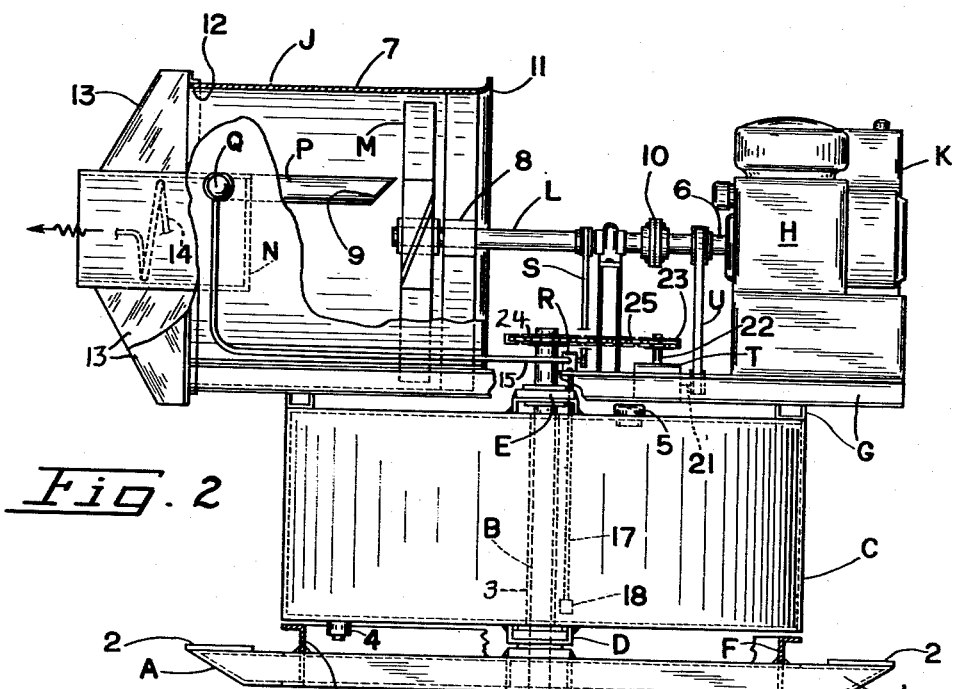
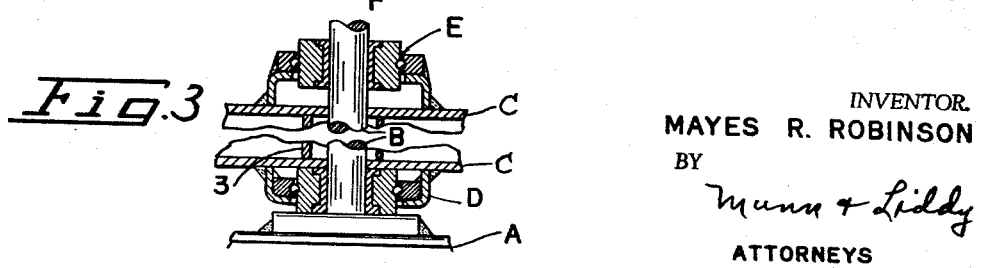
INVENTOR.
MAYES R. ROBINSON
BY
Munn & Liddy
ATTORNEYS

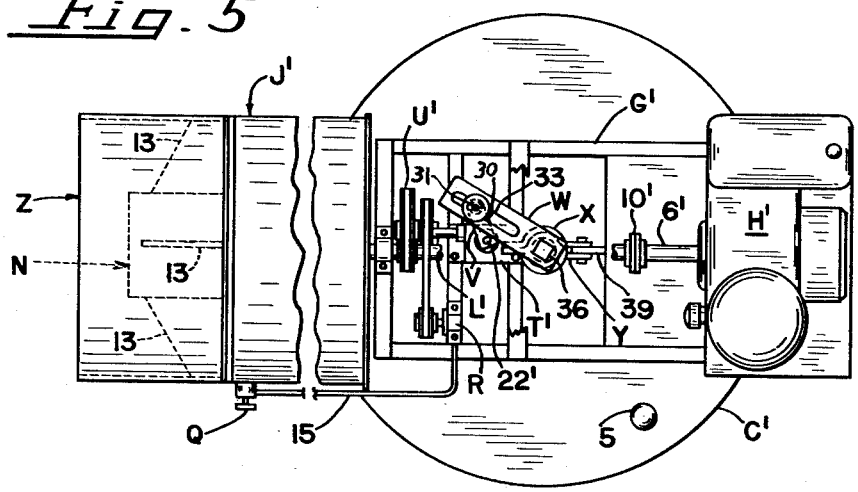
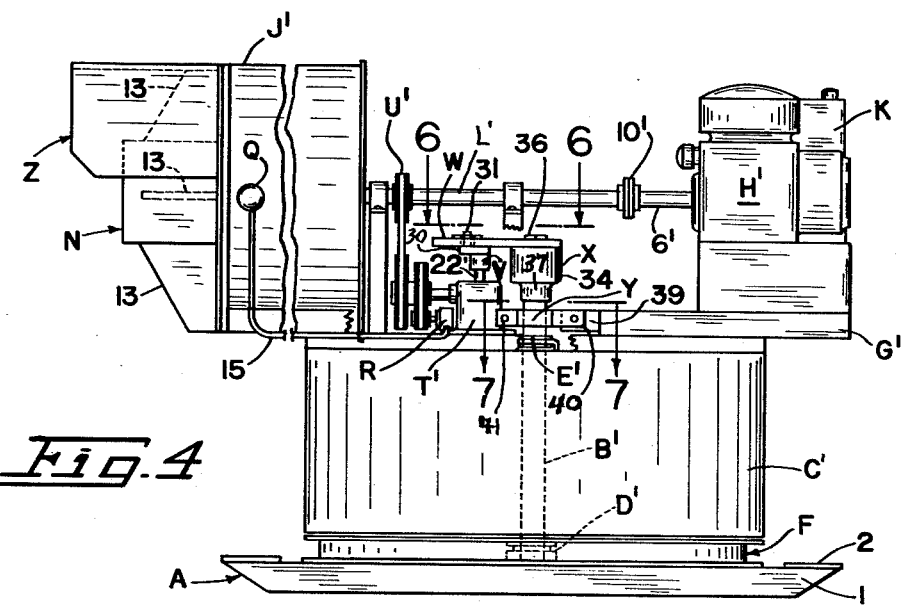
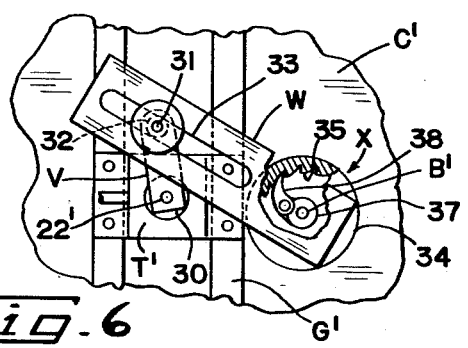
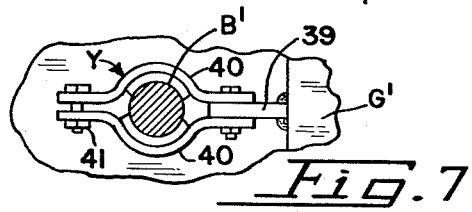

United States Patent Office 3,121,295
Patented Feb. 18, 1964

3,121,295
ROTARY AIR-CIRCULATING MACHINE
Mayes R. Robinson, % Robinson Corp.,
San Martin, Calif.
Filed Feb. 1, 1962, Ser. No. 170,379
8 Claims. (Cl. 47—2)

The present invention relates to improvements in a rotary air-circulating machine and it consists of the combinations, constructions and arrangements hereinafter described and claimed.

In my copending application on a two-directional agricultural heater, Serial Number 84,718, filed January 24, 1961, I disclose a portable device which carries two hot air blowers that face in opposite directions for blowing a stream of hot air from each side of the device as it is moved between two rows of fruit trees or the like. The portable device must be pulled by a tractor or other powered vehicle and it requires a man to operate the vehicle.

In certain cases, a rotary air-circulating machine may take the place of the portable device disclosed in my copending application mentioned above. This rotary air circulating machine has several unique features. I rotatably mount a cylindrical fuel tank on a vertical central shaft and the tank will be equally balanced on the shaft whether it is filled with fuel or partially full. The shaft is supported by a skid. I mount a frame on the tank top that extends diametrically across the center of the tank and a hot air blower is mounted at one end of the frame and an engine is mounted at the other end. The weight of the hot air blower on one side of the tank center which is the axis of rotation balances the weight of the engine disposed on the other side of the tank center. The engine operates the hot air blower and also operates a mechanism for rotating the tank, hot air blower and engine about the vertical stationary shaft as a unit.

The weight of the fuel tank and fuel places the center of gravity of the device below the hot air blower and engine. This construction gives stability to the device. The rotating parts of the device, namely the fuel tank, hot air blower and engine are always in perfect balance regardless of the amount of fuel in the tank. This is very important because a constantly balanced mechanism can be easily rotated about the central vertical stationary shaft. The balanced and symmetrical fuel tank is supported by the central shaft and skid. The fuel in the tank is dispensed to the burner of the hot air blower in a balanced relationship whereby the symmetry and the balance of the tank is maintained throughout the operation of the device. The tank, hot air blower and engine will therefore always be in perfect balance.

A modified form of the invention includes a mechanism for intermittently rotating the tank, hot air blower and engine as a unit through a succession of small arcs and through a complete circle of 360°. I have found that if the hot air blower is permitted to stand still for a short time between successive movements which will rotate the blower through a complete circle then the hot air directed from the blower in a radial direction from the axis of rotation will reach a distance many feet further than when the hot air blower is in continuous rotation about the central axis. It should be remembered that if the hot air blower is in continuous rotation then the stream of hot air issuing therefrom will take a slightly arcuate path that extends from the central axis of rotation. When the device is brought to a stop, the arcuate path of the stream of hot air will straighten out and therefore the hot air stream will be projected to a greater distance. The result will be a pulsating effect of the hot air stream caused by the successive and momentary bending of the air stream due to the rotation of the blower followed by the straightening out of the hot air stream and its consequent further reaching out from the axis of rotation.

Other objects and advantages will appear as the specification continues. The novel features of the invention will be set forth in the appended claims.

For a better understanding of my invention, reference should be made to the accompanying drawings, forming part of this specification, in which:

FIGURE 1 is a top plan view of the device with portions being shown in section for clarity;

FIGURE 2 is a side elevation of the device with portions being shown in section for clarity;

FIGURE 3 is an enlarged sectional detail of the upper and lower bearing connections between the rotatable fuel tank and the stationary shaft that supports the tank;

FIGURE 4 is a slide elevation of a modified form of the device and illustrates an intermittent mechanism for step-wise rotating the fuel tank, hot air blower and engine through a complete circle of 360°;

FIGURE 5 is a top plan view of FIGURE 4;

FIGURE 6 is a horizontal view of a part of the device shown on a larger scale and looking in the direction of the plane 6—6 of FIGURE 4, a portion of the pawl and ratchet mechanism being shown in section; and FIGURE 7 is a horizontal section taken along the plane 7—7 of FIGURE 4, and illustrates a braking device on the same scale as in FIGURE 6.

While I have shown only the preferred forms of my invention, it should be understood that various changes, or modifications, may be made within the scope of the annexed claims without departing from the spirit thereof.

Detailed Description

In carrying out my invention I provide a platform or skid indicated generally at A, see FIGURE 2, and this platform has two longitudinally extending and parallel runners 1 that are spaced apart and rigidly held together by cross strips 2. A vertical stationary shaft B extends upwardly from the center of the platform or skid A. A fuel tank C is preferably circular in shape and it has a central tubular portion 3, see FIGURE 3, that encloses the vertical stationary shaft B. The fuel tank is rotatably mounted on the shaft and is held in position by a ball bearing D placed at the bottom of the tank and an upper ball bearing E placed at the top of the tank. The tank can hold one hundred and fifteen gallons of diesel fuel although I do not wish to be confined to any exact quantity of fuel or to any particular size of tank. The tank can be three feet in diameter and twenty-four inches high. A drain plug 4 is placed at the bottom of the tank and an inlet 5 is placed at the top of the tank.

The bearings D and E will support the tank on the stationary shaft B while permitting it to rotate about the shaft. A circular guide F which is angular in cross section as shown in FIGURE 2, has a circumference substantially equal to that of the tank and this guide angle is secured to the platform or skid A so that its center will coincide with the axis of the shaft B. If desired a circular ball-bearing race, not shown, may be placed between the circular guide angle F and the underside of the tank C so that the tank will ride on this ball race as well as on the bearings D and E during the rotation of the tank. The tank will be perfectly balanced on the stationary shaft B whether the tank is entirely filled with a liquid fuel or partly empty.

An elongated frame G is mounted on the top of the tank C and is secured thereto. This frame has a gasoline motor H mounted at one end thereof and a hot air blower J mounted at the other end. A gasoline tank K feeds gasoline to the motor H as required. The type of gasoline engine used is a twelve horse power air cooled engine of a standard construction although I do not wish to be confined to any particular type. No special description is needed for the engine. The engine has an engine shaft 6. The hot air blower J is mounted on one side of the axis of the shaft B and the engine is mounted on the other side so that the two will balance each other. It will be seen that I provide a balanced rotatable unit comprising the tank C, hot air blower J and engine H. This unit rotates freely about the central stationary shaft B. The unit will remain balanced on the shaft whether the tank C is partially full of fuel or entirely full.

The hot air burner J is of the type shown in my copending application on a Two Directional Agricultural Heater, Serial No. 84,718, filed January 24, 1961. A brief description of the hot air blower will now be given. The hot air blower J has a cylindrical casing 7 that is horizontally disposed and is supported by the frame G. A horizontal shaft L is carried by a bearing 8 and the shaft is connected to the engine shaft 6 by a coupling 10. The bearing 8 is mounted on a support which in turn is carried by the frame G. The shaft L has a fan M keyed thereto and when the shaft is rotated by the engine H, it will rotate the fan for drawing air into the cylinder 7 through the outwardly flared entrance end 11 and will expel this air through the exit end 12. At the exit end of the cylinder, I provide a plurality of guide vanes 13 and these vanes support a burner drum N. The burner drum has a spiral inwardly extending vane 14 that will cause the air in the burner to rotate.

It will be noted from FIGURES 1 and 2 that I provide an air feed pipe P that is L-shaped in form. One end 9 of the pipe is placed near to the circumference of the fan M so that the air circulating at high speed at this portion of the fan and within the cylinder 7, will be directed into the L-shaped pipe P. The other end 9' of the pipe P, see FIGURE 1, communicates with the cylindrical portion of the burner N so that the air entering the burner will be rotated therein. A fuel pipe 15 has a portion axially aligned with that portion of the air pipe P that communicates with the burner N. The fuel pipe 15, is provided with a burner nozzle 16 so that the flame from this nozzle will enter the burner N and the fuel from the nozzle will mix with the air so as to provide a complete combustion for the fuel within the burner.

FIGURES 1 and 2 show the fuel pipe 15 provided with a hand valve Q and the pipe extends to a fuel pump R. The pump is operated by a chain and sprockets or a belt drive indicated at S which operatively connects the shaft L to the fuel pump R. A dip pipe 17 extends from the fuel pump R down into the fuel tank C and the lower end of the dip pipe is provided with a foot valve and strainer indicated generally at 18, see FIGURE 2. The construction is such that as soon as the engine H rotates the fan M through the shaft 16, coupling 10 and shaft L, the pump R will force fuel from the tank C to the nozzle 16 where it is burned and the burning fuel will enter the burner N and be rotated by the spiral 14 so that complete combustion of the fuel takes place within the burner. A sufficient quantity of air is fed to the burner by the L-shaped pipe P because the air in the cylinder is at its highest velocity at the end 9 and will enter the pipe P at this end and will enter the burner N at the end 9' of the same L-shaped pipe.

I provide means for rotating the fuel tank C together with the engine H and the hot air blower J as a balanced unit through an arc of 360° so that the hot air from the blower J will be sent in an axial direction from the blower with the axis of the shaft L acting as the center of the stream of hot air. The column of heated air will describe a full circle of 360°, as the blower is rotated with the fuel tank C about the shaft B.

A gear reduction mechanism indicated generally at T in FIGURES 1 and 2, is carried by the frame G and has a horizontal shaft 21 extending therefrom. The shaft 21 is operatively connected to the shaft L by a belt drive indicated generally at U or it may be a chain and sprocket drive. A vertical shaft 22 extends from the gear reduction mechanism T and this shaft carries a sprocket 23. The stationary shaft B has a stationary sprocket 24 keyed thereto. The shaft L has a portion broken away in FIGURE 1 so that the sprocket 24 can be seen. A sprocket chain 25 interconnects the sprocket 23 with the sprocket 24. It will be seen from this construction that as the shaft L rotates, the belt drive U will rotate the shaft 21 at a high speed and the shaft 22 extending vertically from the gear reduction unit T, will be rotated at a much slower speed. The rotation of the sprocket 23 by the shaft 22 will cause the sprocket chain 25 to rotate the frame G about the shaft B because the sprocket 24 is stationary. A rotation of the frame G will also rotate the tank C because the two are connected together. The tank in turn will rotate on its bearings D and E. The tank C, frame G, engine H and blower J will rotate as a perfectly balanced unit and will make about one revolution every four minutes although I do not wish to be confined to any certain speed.

*Operation*

The device may be moved to any position desired by sliding the skid A over the ground or other supporting surface. The skid A then acts as a stationary support and the tank C together with the frame G, engine H and hot air blower J will rotate about the stationary shaft B as a balanced unit while being supported by bearings D and E. The air circulating machine is now free to rotate about the shaft. The center of gravity of the entire machine is at a low level regardless of the amount of fuel in the tank C and this is due to the fact that the tank is mounted below the frame G. As the fuel is consumed, it will have little effect on the stability of the rotating mass and the balanced arrangement of the fuel tank C, hot air blower J and engine H. The tank C is made symmetrical and is balanced on the shaft B so that it is free to rotate about the shaft. The tank and shaft are symmetrically arranged on the skid A. The tank will hold a supply of fuel that can be dispensed therefrom in a balanced relationship whereby the symmetry and the balance of the tank is maintained throughout the operation of the device and throughout the dispensing of the fuel. The hot air blower balances the engine and both are carried by the fuel tank which is also balanced. Therefore the three items of fuel tank, blower and engine will provide a balanced unit on the shaft B at all times.

There is a positive rotation of the hot air blower around the vertically fixed shaft B. The hot air circulating blower J includes the cylindrical casing 7 for giving direction to the flowing air and it also includes the straightening vanes 13 on the discharge side 12 of the blower for causing the hot air to flow in a straight line. These vanes prevent the rotation of the air in the column as it is projected by the blower. The vanes also support the combustion chamber or burner N that is placed at the axis of the fan housing 7 that is normally a dead air space. The burner therefore does not interfere with the flow of high velocity air leaving the fan housing.

The interior of the burner N is fitted with the swirling vane 14 or helix and this is for the purpose of aiding in the complete combustion of the fuel as it is directed into the burner from the nozzle 16. High velocity air is fed into the burner by the L-shaped pipe P. In this way the air for the burner N is received from the primary circulating air delivered by the fan. Another advantage of placing the burner N in the center of the housing results in the burner being completely surrounded by the cold air that is moving at a high velocity. This high speed moving cylindrical column of air from the blower J will contain the heated air issuing from the burner N. In fact the heated air will be delivered in the center of the high velocity moving air stream and the heated air cannot rise into the atmosphere until it has delivered all of its heat to the cold air moving stream that surrounds it. The result is that the air from the hot air blower will be directed horizontally for a great distance and all of this air will be effectively and uniformly heated by the hot central heated air.

Since the hot air blower J and the engine assembly are mounted directly on the fuel tank C and revolve therewith as a complete unit, the use of rotary joints to feed the blower and engine are done away with. Such joints would be necessary if the fuel tank C did not rotate with the hot air blower J and if the fuel tank for the engine did not rotate with the engine. Moreover the placing of the fuel tank C under the blower and engine for supporting the two, provides the lowest possible center of gravity for the device. The hot air blower J at one end of the frame G, balances the engine and fuel tank for the engine at the opposite end of the same frame. Therefore a varying quantity of fuel in the tank C that feeds the burner in the hot air blower J, will have no effect on this balanced arrangement. The weight of the fuel in the tank C provides a low center of gravity for the rotating unit regardless of how much fuel is in the tank. The balanced arrangement of the fuel tank, hot air blower and engine provides a unit that can be easily rotated by the same engine that operates the blower.

In FIGURES 4 to 7 inclusive, I show a modified form of the invention. In this form the fuel tank C', the frame G', the hot air blower J' and the gasoline engine H' provide a balanced unit that is intermittently rotated about the stationary shaft B' on the bearings D' and E'. To accomplish this the shaft L' which is rotated at about 2,800 r.p.m. by the engine shaft 6' and coupling 10' is connected by a V-belt and pulleys U' to a reduction gearing assembled in a gear box T'.

A vertical shaft 22' projects upwardly from the gear box T' and it carries an eccentric crank V, see FIGURE 6. The eccentric crank has a radially extending arm 30 and this arm is provided with an upwardly extending pin 31 at its outer end and a roller 32 is rotatably mounted on the pin 31. The roller rides in a slot 33 provided in an actuating arm W. The free end of the actuating arm W is connected to a pawl and ratchet mechanism indicated generally at X. Any type of pawl and ratchet may be used. I show the ratchet in the form of a cylinder 34 that has an inner circular row of ratchet teeth 35. The actuating arm W has a square opening for receiving a square projection 36, see FIGURES 4 and 5, that projects from the closed top of the cylinder and is axially aligned therewith. The stationary shaft B' has a pawl-carrying member 37 keyed to the top thereof and a spring-pressed pawl 38 is yieldingly held in engagement with the ratchet teeth 35.

When the actuating arm W is swung in a clockwise direction about the vertical axis of the stationary shaft B' due to the rotation of the eccentric crank V through an arc of 180° on its shaft 22', the ratchet cylinder 34 will be rotated through a small arc and cause one or more ratchet teeth 35 to slip past the spring-pressed pawl 38. When the actuating arm W is acted upon by the eccentric crank V during the remaining 180° swing of the crank to swing the arm W counterclockwise about the axis of the stationary shaft B', this swing of the arm is prevented by one of the ratchet teeth 35 engaging with the pawl 38. Instead the arm W will be held stationary by the shaft B', the pawl carrying member 37 that is keyed to the shaft, the pawl 38 engaging with a ratchet tooth 35 and the cylindrical ratchet 34 to which the arm W is secured. The result will be a swinging of the gear casing T', the frame G' and the tank C' in a counterclockwise direction through a small arc about the axis of the stationary shaft as a center. Since the frame G' supports the hot air blower J' and the engine H' then the fuel tank, hot air blower, and engine will be rotated as a unit through a small arc about the axis of the stationary shaft B'.

A brake band indicated generally at Y in FIGURE 7 is supported by a member 39 that in turn is connected to the frame G', see also FIGURES 4 and 5. The brake band comprises a pair of brake arms 40 and these arms have one of their ends secured to the member 39 by a bolt and then have a semi-cylindrical portion for encircling a portion of the stationary central shaft B. The inner surfaces of the semi-cylindrical portions carry brake shoes that frictionally contact the shaft B' and the outer ends of the arms 40 are connected together by a bolt 41. The brake shoes will apply a continual braking action on the shaft B' to stop further rotation of the fuel tank C' and its associate parts as soon as the rotative movement caused by the eccentric crank V and actuating arm W, ceases. This will prevent the tank and associate parts from continuing to rotate after they have once been set in motion and when the actuating arm W is started to swing in a clockwise direction by the eccentric crank V. It is possible to have a two-way pawl and ratchet which can be adjusted for intermittently rotating the tank and associate parts either in a clockwise or counterclockwise direction.

I have found that where the hot air blower J is continuously rotated with the fuel tank C and associate parts through a complete circle about the axis of the central stationary shaft B, then the hot air stream projected by the blower will be curved into a slight arc rather than extend in a true radius from the shaft axis. It is apparent that if the stream of hot air does flow in a slight arc then the length of the stream will not reach as far out from the axis of the shaft B as it would were the blower J to remain stationary and the hot air stream assume a straight radial line from the shaft axis.

When the blower J' in the modified form of the device is intermittently rotated about the axis of the central stationary shaft B' then the blower will remain stationary during the periods of time between adjacent small arcuate movements of the tank C' and blower J'. It is during these periods of rest or "dwells" of the blower J' that the stream of hot air has an opportunity of straightening out in a true radial direction from the axis of the central shaft B'. The result of this momentary straightening out of the hot air stream between each successive small arcuate rotative movement of the blower will be that the hot air stream will extend to its maximum distance from the axis of the shaft B'. The result will be a series of pulsations of the hot air stream to a greater distance from the shaft axis. This is an important feature of the invention.

The modified form of the device shown in FIGURES 4 to 7 inclusive operates in the same manner as the device shown in FIGURES 1 to 3 inclusive except that there is intermittent rotative motion in the modified form and continuous rotative motion in the first described form. Corresponding parts in both forms that are not specifically referred to when describing the modified form will be given like reference letters or numerals.

In FIGURES 4 and 5, I show a shield Z extending from the outlet end of the hot air blower J' to protect plants from direct radiation. The shield can be in the form of substantially a half cylinder as shown or it may be a complete cylinder, not shown.

I claim:

1. In a device of the type described: a skid which may be moved over the ground into a desired position; a vertical non-rotatable shaft mounted on the skid; a fuel tank disposed around and rotatably mounted on the shaft in a balanced position; a hot air blower and burner supported by and superjacent said tank and rotatable therewith; an engine for operating the hot air blower and supported by the tank and rotatable therewith; the blower and engine being mounted on opposite sides of said shaft and so positioned with respect to the shaft as to balance each other; means actuated by the engine for rotating the hot air blower, engine and tank about the shaft as a unit through a circle of 360°; and means for feeding fuel from the tank to the burner for causing the latter to heat the column of air issuing from the hot air burner; said hot air blower directing the column of heated air in a radial direction from the shaft as a center and said rotating means causing the column of heated air to swing through a complete circle of 360°.

2. The combination as set forth in claim 1: and in which the fuel tank is a right circular cylinder and has upper and lower ends; a central tubular member extending vertically through the tank and having its ends secured to the upper and lower ends of the tank; said central tubular member receiving the vertical shaft; and bearings rotatably connecting the upper and lower ends of the tank with the stationary shaft; whereby the center of gravity of the rotating unit of tank, hot air blower and engine is at a low point and regardless of the amount of fuel in the tank.

3. The combination as set forth in claim 1: and in which the hot air blower includes a horizontal cylinder whose axis intersects the extended axis of said shaft; a fan rotatably mounted in the cylinder and being driven by the engine; the axis of the burner being axially aligned with the axis of the fan and the cylinder and said burner being placed on the down air stream side of the fan and completely surrounded by a column of high-velocity cold air moved by the fan; whereby the blower will direct a column of heated air in a radial direction from the shaft axis and this column of air will move through a complete circle of 360° as the engine rotates the blower about the shaft.

4. In a device of the type described; a skid, a vertically disposed shaft affixed thereto, a fuel tank rotatably mounted on said shaft in a balanced position, said tank being disposed in concentric relation to said shaft, a frame mounted on the top of said tank in a plane parallel to said skid and extending across the axis of said shaft, a hot air blower mounted on said frame on one side of the center of said tank, an engine mounted on said frame on the other side of the center of said tank, the weight of said engine offsetting the weight of said blower to maintain said frame and tank in a balanced condition, means connecting said engine to said blower for rotating same, and means carried by said frame superjacent said tank and connected to said engine for rotating said tank and frame as a unit about said shaft, said blower including a cylindrical housing mounted on said frame for directing a column of heated air from its outlet end in a horizontal plane and in a radial direction with respect to the shaft axis, and a semi-cylindrical shield mounted on said housing at the outlet end thereof.

5. In a device of the type described, a skid, a vertically disposed shaft affixed thereto, a fuel tank rotatably mounted on said shaft in a balanced position, said tank being disposed in concentric relation to said shaft, a frame mounted on the top of said tank in plane parallel to said skid and extending across the axis of said shaft, a hot air blower mounted on said frame on one side of the center of said tank, an engine mounted on said frame on the other side of the center of said tank, the weight of said engine offsetting the weight of said blower to maintain said frame and tank in a balanced condition, means connecting said engine to said blower for rotating same, and means carried by said frame superjacent said tank and connected to said engine for rotating said tank and frame as a unit about said shaft, said last mentioned means including a sprocket affixed to said shaft, a gear reduction unit mounted on said frame, a sprocket wheel carried by said unit and a chain entrained about said sprocket and sprocket wheel.

6. In a device of the type described, a skid, a vertically disposed shaft affixed thereto, a fuel tank rotatably mounted on said shaft in a balanced position, said tank being disposed in concentric relation to said shaft, a frame mounted on the top of said tank in a plane parallel to said skid and extending across the axis of said shaft, a hot air blower mounted on said frame on one side of the center of said tank, an engine mounted on said frame on the other side of the center of said tank, the weight of said engine offsetting the weight of said blower to maintain said frame and tank in a balanced condition, means connecting said engine to said blower for rotating same, and means carried by said frame superjacent said tank and connected to said engine for rotating said tank and frame as a unit about said shaft, said last mentioned means including a gear reduction unit mounted on said frame, an eccentric crank carried by said unit, said crank provided with an arm having a roller thereon for movement within a slotted arm mounted upon a ratchet member, said shaft having a pawl mounted thereon for engaging said ratchet whereby said tank and frame will be rotated intermittently through small arcs about said shaft.

7. The combination as set forth in claim 6: and in which braking means is applied to stop the rotation of the tank, blower and engine between each successive small arc rotation caused by said rotating means.

8. In a device of the type described, a skid, a vertically disposed shaft affixed thereto, a fuel tank rotatably mounted on said shaft in a balanced position, said tank being disposed in concentric relation to said shaft, a frame mounted on the top of said tank in a plane parallel to said skid and extending across the axis of said shaft, a hot air blower mounted on said frame superjacent said tank and positioned on one side of the center of said tank, an engine mounted on said frame superjacent said tank and positioned on said frame on the other side of the center of said tank, the weight of said engine offsetting the weight of said blower to maintain said frame and tank in a balanced condition, means connecting said engine to said blower for rotating same, and drive means carried by said frame superjacent said tank and connected to said engine for rotating said tank and frame as a unit about said shaft.

References Cited in the file of this patent
UNITED STATES PATENTS
2,972,208    Martin _____ Feb. 21, 1961